United States Patent
Kim et al.

(10) Patent No.: US 7,483,112 B2
(45) Date of Patent: *Jan. 27, 2009

(54) CARBON NANO TUBE TECHNOLOGY IN LIQUID CRYSTAL ON SILICON MICRO-DISPLAY

(75) Inventors: Gihong Kim, Milpitas, CA (US); Charles Chul-Whei Koo, San Jose, CA (US)

(73) Assignees: Sysview Technology, Inc., San Jose, CA (US); Wuhan Splendid Optronics Technology Co., Ltd. (CN)

( * ) Notice: Subject to any disclaimer, the term of this patent is extended or adjusted under 35 U.S.C. 154(b) by 668 days.

This patent is subject to a terminal disclaimer.

(21) Appl. No.: 11/224,912

(22) Filed: Sep. 12, 2005

(65) Prior Publication Data

US 2006/0072063 A1    Apr. 6, 2006

Related U.S. Application Data

(60) Provisional application No. 60/615,921, filed on Oct. 5, 2004, provisional application No. 60/635,541, filed on Dec. 13, 2004, provisional application No. 60/710,993, filed on Aug. 23, 2005.

(51) Int. Cl.
*G02F 1/1339* (2006.01)

(52) U.S. Cl. .................... 349/155; 349/153; 349/156

(58) Field of Classification Search ................ 349/155, 349/153, 190, 156, 2
See application file for complete search history.

(56) References Cited

U.S. PATENT DOCUMENTS

| | | | | |
|---|---|---|---|---|
| 5,999,306 | A | * | 12/1999 | Atobe et al. ................ 359/295 |
| 6,122,033 | A | * | 9/2000 | Mathew et al. .............. 349/155 |
| 6,791,278 | B2 | * | 9/2004 | Russ et al. ............... 315/169.3 |
| 2003/0007117 | A1 | | 1/2003 | McKnight et al. |

FOREIGN PATENT DOCUMENTS

| | | |
|---|---|---|
| EP | 64000925 | 1/1989 |
| JP | 64000925 | 1/1989 |

OTHER PUBLICATIONS

Wei, B.Q., et al., Growing Pillars of Densely Packed Carbon Nanotubes on Ni-coated Silica, Carbon 40 (2002) 47-51.
Kazlas, Peter T., et al., Miniature Liquid-Crystal-on-Silicon Display Assembly, Optics Letters, vol. 23, No. 12, Jun. 15, 1998.

* cited by examiner

*Primary Examiner*—Mike Qi
(74) *Attorney, Agent, or Firm*—Joe Zheng

(57) ABSTRACT

A nano-liquid crystal on silicon (nano-LCoS) chip having carbon nanotube (CNT) pillars that are grown on a glass substrate thereof. As the heights of the CNT pillars are uniform, the CNT pillars can function as spacers providing a uniform cell gap between the glass substrate and a silicon chip of the nano-LCoS chip. Also, being excellent electrical conductors, CNT pillars can form a part of the electrical connection between an outside voltage source and the indium tin oxide (ITO) layer formed on the glass substrate. The nano-LCoS chip includes nano-LCoS alignment keys that are formed in the silicon chip and connected to the CNT pillars. By applying the same voltage to the ITO layer and keys, a portion of the liquid crystal activated by the keys become transparent fiduciary marks for optical alignment of nano-LCoS chips.

21 Claims, 10 Drawing Sheets

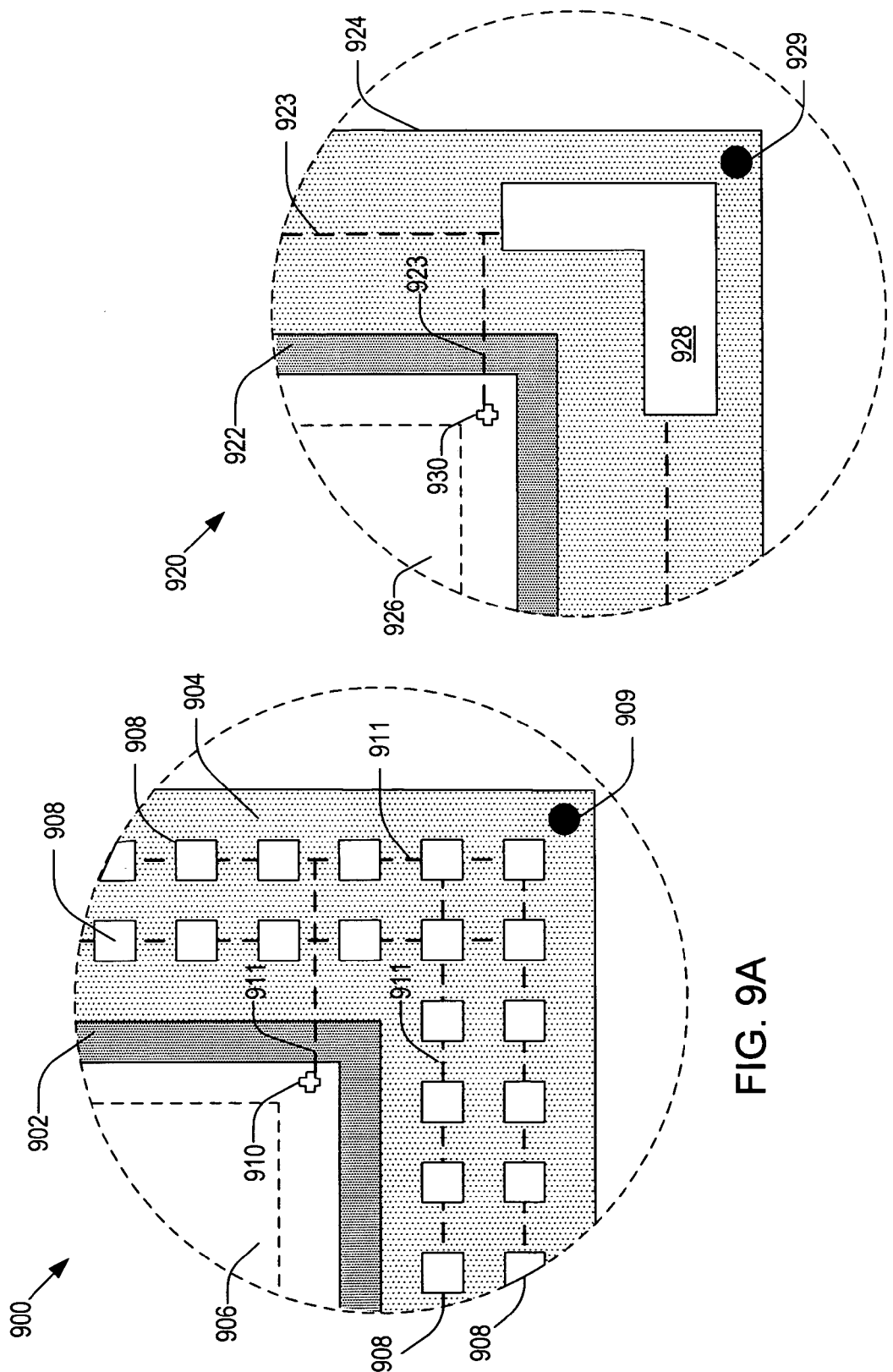

CARBON NANO TUBE TECHNOLOGY IN LIQUID CRYSTAL ON SILICON MICRO-DISPLAY

CROSS REFERENCE TO RELATED APPLICATIONS

This application claims the benefit of U.S. Provisional Applications No. 60/615,921, entitled "Carbon nanotube technology in liquid crystal on silicon micro-display," filed on Oct. 05, 2004, No. 60/635,541, entitled "Carbon nanotube technology in liquid crystal on silicon micro-display with enhanced scalability and alignment," filed on Dec. 13, 2004, and No. 60/710,993, entitled "Nano-liquid crystal on silicon chip having reduced noise," filed on Aug. 23, 2005, which are hereby incorporated herein by reference in their entirety.

BACKGROUND OF THE INVENTION

The present invention relates to micro-display devices, and more particularly to liquid crystal on silicon (LCoS) chip having carbon nanotube (CNT) pillars.

A micro-display device having LCoS structure (shortly, LCoS device) is an important component of various optical projection systems. LCoS devices, typically in the form of chips, are becoming increasingly prevalent in micro-display applications, such as big-screen TV, PC monitor, projector, etc. and may eventually replace cathode ray tubes (CRTs) in various visual display devices. (Hereinafter, term LCoS chip and LCoS device are used interchangeably.) A conventional LCoS chip has a liquid crystal positioned on a silicon substrate, where the light incident on the LCoS chip carries the information of images formed in the liquid crystal and is subsequently expanded by an optical system to display the images for human eyes. A conventional high-definition (HD) TV screen may have 1,920 and 1,080 scan lines in the horizontal and vertical directions, respectively.

One of the important parameters determining the image quality of an LCoS chip is the uniformity of the cell gap (sometimes referred to as the "cell spacing") in the LCoS chip. The cell gap is the space between the upper and lower substrates of the chip, with the liquid crystal being contained within the cell gap. For liquid crystal displays (LCDs), the upper and lower substrates are typically made of glass material. For LCoS chips, the upper substrate is typically made of glass, and the lower substrate is made of silicon, as illustrated in FIGS. 1A-1D.

FIG. 1A is an exploded perspective view of a conventional LCoS chip shown at 100, illustrating only few components for the purpose of simplicity. As depicted, the LCoS chip includes: an upper glass substrate 104; an indium tin oxide (ITO) layer 106; a lower silicon substrate 108; a ceramic substrate 102 for providing mechanical support for the silicon substrate 108; and an ITO connector 114, where the ITO connector 114 forms a part of the electrical connection from an outside voltage source to the ITO layer 106. Interposed between the upper 104 and lower substrates 108 is a rim seal 110 for containing a liquid crystal 112. The silicon substrate 108 includes electrical circuitry for forming images in the liquid crystal 112, where the incoming light 116a reflects from the silicon substrate 108 to become an outgoing light 116b carrying the image information. The rim seal 110 includes spacers 136 (FIG. 1B) that may provide uniformity of the cell gap and have a spherical or a cylindrical shape.

It is well know that a consistency in the thickness and/or uniformity of the liquid crystal 112 within the rim seal 110 must be achieved in order to obtain a high-quality optical image on the screen. In manufacturing the LCoS chip shown at 100, the typical practice is to spray the spacers 136 on a rim seal 110 prior to assembling or mating the glass substrate 104 (having the ITO layer 106 formed thereon) with the silicon semiconductor substrate 108. The term "mating" refers to the process of mounting the glass substrate 104 on top of the silicon substrate 108, applying a preset pressure and curing the rim seal 110. The uneven height defined by spacers 136, 156, and 176, as illustrated in FIGS. 1B-1D, results in non-uniformity of the cell gap, which in turn generates undesirable optical rings or color image shifts on the screen. FIGS. 1B-1D are cross sectional views of conventional LCoS chips, taken along the direction A-A (FIG. 1A), where the upper glass substrates 124, 144, and 164 are curved (convex or concave) or tilted with respect to the silicon substrates 128, 148, and 168, respectively, due to the non-uniformity of the spacer dimension.

As consumers can easily perceive the optical rings or color image shifts, the non-uniformity has been a challenging problem to overcome. To alleviate this problem, for example, many commercially available LCoS chips are fabricated without spacers. However, this process is not a guarantee for quality or yield because with larger size variations of silicon substrates or with thinner cell gaps, it is mechanically difficult to support constant spacing uniformity when mating the upper substrate with the lower substrate. In fact, this can become a serious issue if yield is significantly reduced due to the higher number of LCoS chips that will need to be discarded for having poor uniformity. Thus, there has been a strong need for a new approach to control the cell gap and provide a consistency in the uniformity of the liquid crystal.

SUMMARY OF THE INVENTION

The present invention discloses a nano-LCoS chip having CNT pillars that are grown on the glass substrate of the nano-LCoS chip and function as spacers for a highly uniform cell gap of the nano-LCoS chip. By adjusting the growth conditions of the CNT pillars, the height of the CNT pillars can be controlled in a precise manner and, as a consequence, the cell gap can be tailored to each specific application of the nano-LCoS chip. Also, being excellent electrical conductors, CNT pillars can form a part of the electrical connection between a voltage source and the ITO layer of the nano-LCoS chip, making the conventional ITO connector of the LCoS chip optional. The nano-LCoS chip also includes nano-LCoS alignment keys that are formed in the silicon substrate of the nano-LCoS chip and connected to the CNT pillars. By applying the same voltage to the ITO layer and keys, a portion of the liquid crystal activated by the keys become transparent fiduciary marks for optical alignment of nano-LCoS chips. The present invention also discloses methods for growing the CNT pillars on the glass substrate.

In one aspect of the present invention, a nano-liquid crystal on silicon (LCoS) chip includes a silicon substrate portion and a rim seal that has a generally closed loop shape and is laid on the silicon substrate portion to form a space surrounded by the rim seal and the silicon substrate portion. The LCoS chip also includes a glass substrate portion that is aligned substantially in parallel to the silicon substrate portion and positioned over the rim seal to enclose the space, where a liquid crystal is filled in the space. Positioned between the glass and silicon substrate portions are carbon-nanotube (CNT) pillars that have a predetermined height and serve as spacers providing a uniform spacing between the glass and silicon substrate portions. The CNT pillars are grown on the glass substrate portion by the conventional chemical vapor deposition technique.

In another aspect of the present invention, a nano-liquid crystal on silicon (LCoS) chip includes a silicon substrate portion. The silicon substrate portion includes a silicon chip, a passivation layer formed on the silicon chip, and a first inorganic alignment layer formed on the passivation layer. The nano-LCoS chip also includes a rim seal that has a generally closed loop shape and that is laid on the first inorganic alignment layer to form a space surrounded by the rim seal and first inorganic alignment layer. Located over the rim seal is a glass substrate portion that is aligned substantially in parallel to the silicon substrate portion and includes: a glass substrate; an anti-reflection layer formed on the top surface of the glass substrate; an indium tin oxide (ITO) layer formed on the bottom surface of the glass substrate; and a second inorganic alignment layer formed on the bottom surface of the ITO layer. A plurality of carbon-nanotube (CNT) pillars are positioned between the glass and silicon substrate portions, wherein the CNT pillars have a predetermined height and serve as spacers providing a uniform spacing between the first and second inorganic alignment layers. The CNT pillars are grown on the glass substrate portion, where the passivation and first inorganic alignment layers have CNT receptor holes for engaging the CNT pillars. A liquid crystal is filled in the space enclosed by the first and second inorganic alignment layers and the rim seal.

These and other features, aspects and advantages of the present invention will become better understood with reference to the following drawings, descriptions, and claims.

BRIEF DESCRIPTION OF THE DRAWINGS

FIGS. 9A-9B are top views of alternative embodiments of the nano-LCoS chip depicted in FIGS. 2A and 6.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
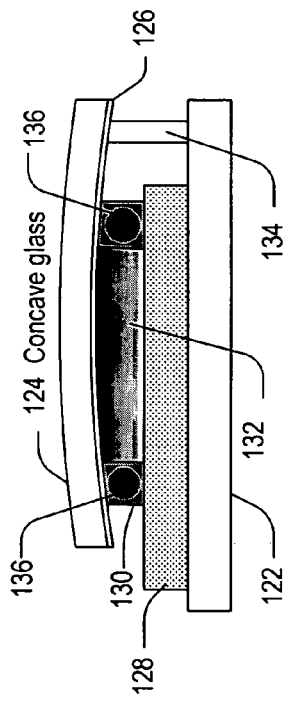
FIG. 1A is an exploded perspective view of a conventional LCoS chip.
Figure 1B:
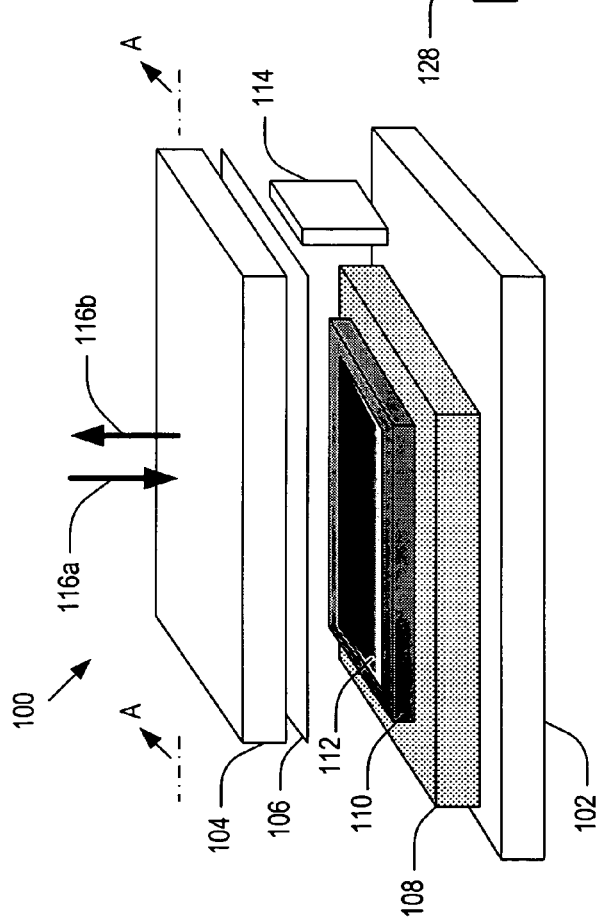
FIGS. 1B-1D are cross-sectional views of conventional LCoS chips, taken along the direction A-A, illustrating non-uniformities of the cell gaps.
Figure 1C:
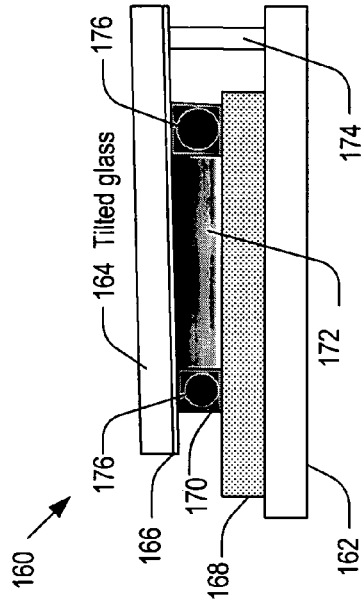
Figure 1D:
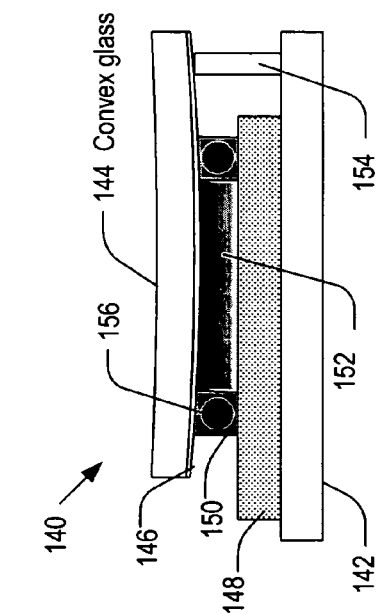
Figures 2A, 2B:
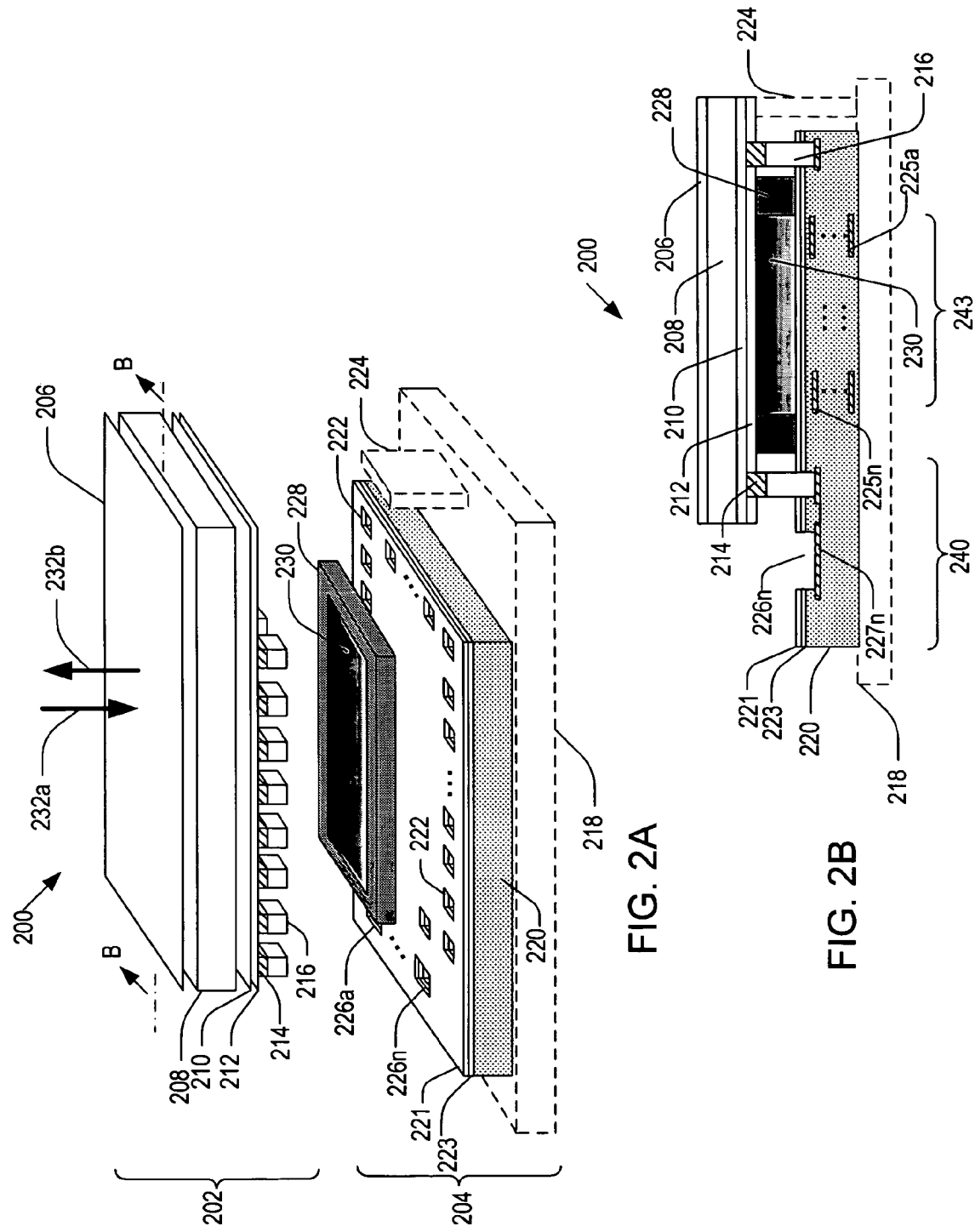
FIG. 2A is an exploded perspective view of a nano-LCoS chip in accordance with the preferred embodiment of the present invention.
FIG. 2B is a cross sectional view of the nano-LCoS chip in FIG. 2A, taken along the direction B-B.

Referring now to FIG. 2A, FIG. 2A is an exploded perspective view of a nano-LCoS chip shown at 200 in accordance with the preferred embodiment of the present invention. FIG. 2B is a cross sectional view of the nano-LCoS chip in FIG. 2A, taken along the direction B-B. As illustrated in FIGS. 2A-2B, the Nano-LCoS chip 200 may include a glass (substrate) portion 202 and a silicon (substrate) portion 204. The glass portion 202 may include: a glass (substrate) 208, preferably made of quartz, fused silica, high temperature glass or corning glass which has similar thermal expansion coefficient with the silicon substrate; an anti-reflection (AR) layer or coating 206 for protecting the glass 208 from mechanical damages and reducing reflection of the incoming light 232$a$ from the top surface of the glass 208; an Indium Tin Oxide (ITO) layer 210; an inorganic alignment layer 212, preferably made of silicon dioxide, being in contact with liquid crystal 230 and preventing the chemical reaction between the ITO layer 210 and the liquid crystal 230; and CNT pillars or columns 216 grown on a metal seed layer (CNT catalyst) 214. The process for forming the ITO layer 210, inorganic layer 212, seed layer (CNT catalyst) 214, and CNT pillars 216 on the glass 208 will be explained in connection with FIGS. 3A-5L.

The silicon portion 204 may include: a silicon substrate or chip 220 having circuit elements in the form of stacked poly-crystalline/metal layers 225$a$-$n$ (Further details of these layers can be found in the previously referred U.S. provisional application, No. 60/710,993, entitled "Nano-liquid crystal on silicon chip having reduced noise," filed on Aug. 23, 2005, which is incorporated by reference.); CNT female counterparts or receptor holes 222 for receiving the CNT pillars 216; pads 227$a$-$n$ (FIG. 2B) that connects outer circuit elements (such as lead frames or terminals of flex cables) with the circuit elements in the silicon chip 220; pad holes or open areas 226$a$-$n$ corresponding to the pads 227$a$-$n$, respectively; a passivation layer 223; and an inorganic alignment layer 221 for preventing the chemical reaction between the passivation layer 223 and the liquid crystal 230. The liquid crystal 230 may be contained in the space defined by a liquid crystal glue layer or rim seal 228 and two inorganic alignment layers 212 and 221. The rim seal 228 may be made of a UV glue, such as Norland 61, Norland 65, Kyoritsu 770, etc.

Optionally, the silicon chip 220 may be mounted on a ceramic substrate 218 that provides additional mechanical strength. The ceramic substrate 218 may also have an electrical circuit that connects an outer voltage source to the ITO layer 210 via the ITO connector 224.

As illustrated in FIG. 2A, the incoming light 232$a$ may pass through the glass portion 202 and liquid crystal 230. The liquid crystal 230 may be located over a liquid crystal filling area 243 (FIG. 2B). The liquid crystal filling area 243 may include a pixel area 242 (FIG. 6) that covers a pixel array, where an image is formed in the liquid crystal 230 over the pixel area by applying a voltage difference between the ITO layer 210 and the pixel array. The peripheral area 240 (FIG. 2B) of the silicon chip 220 may include pads 227$a$-$n$, pad holes 226a-n, CNT receptor holes 222 (FIG. 2A) and other circuitry for providing connections between the pads 227a-n and the circuit elements in the pixel area 242 (FIG. 6), such as polycrystalline/metal layers 225a-225n. The incoming light 232a may pass through the image in the liquid crystal 230, reflect from a metal layer 225n of the silicon substrate 220 and pass through the image again. Then, the light 232b carrying the information of the image may pass through the glass portion 202 again and leave the nano-LCoS chip 200.

As will be explained later, the CNT pillars 216 may be grown uniformly on the glass substrate 208 by a conventional technique, such as chemical vapor deposition (CVD) technique. The CNT pillars 216, which are uniform in height and have exceptional mechanical strength, can serve as spacers for a highly uniform cell gap. Accordingly, the nano-LCoS chip 200 may generate high-quality optical images in the liquid crystal 230. Also, by adjusting the growth conditions of the CNT pillars 216, the height of the CNT pillars 216 can be controlled in a precise manner, which in turn translates into a high manufacturing yield of the nano-LCoS chip. In addition, as depicted in FIG. 2B, the CNT pillars 216 may connect the pads 227a-n to the ITO layer 210, making the conventional ITO connector 224 an optional connection element.

Figure 3A:
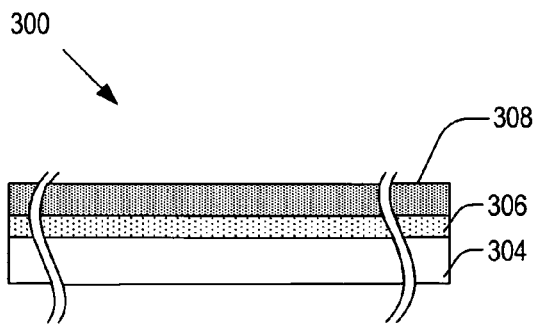
FIGS. 3A-3F illustrate steps of forming the glass portion of the nano-LOCS chip in FIG. 2A in accordance with the preferred embodiment of the present invention.

As illustrated in FIGS. 2A-2B, the glass portion 202 may include several layers formed on the glass 208; the anti-reflection layer 206, ITO layer 210, inorganic alignment layer 212, metallic seed layer (CNT catalyst) 214, and CNT pillars 216. FIGS. 3A-3F are cross sectional diagrams of a glass portion at various steps of growing the layers on the glass, taken along the direction B-B, in accordance with the preferred embodiment of the present invention. As depicted in FIG. 3A, an ITO layer 306 may be formed on one side of a glass 304. The glass 304 may be made of a material that has a high melting point since CNT pillars are required to grow thereon (FIG. 3E). The ITO layer 306 may be formed on the glass 304 by a conventional sputtering technique. Then, a photo-resist (PR) layer or coating 308 may be coated on the ITO layer 306 to form a glass portion shown at 300.

Figure 3B:
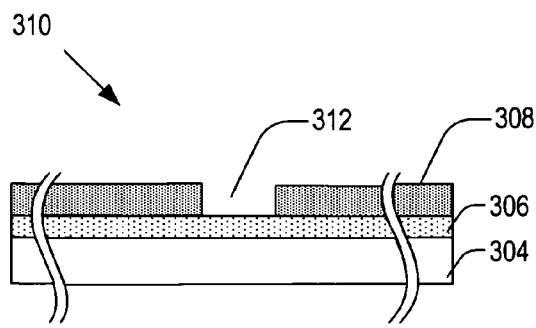
Figure 3C:
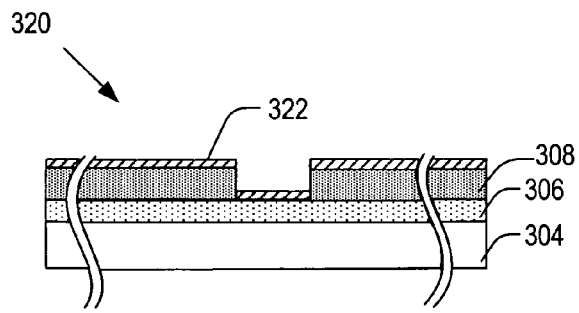
Figure 3D:
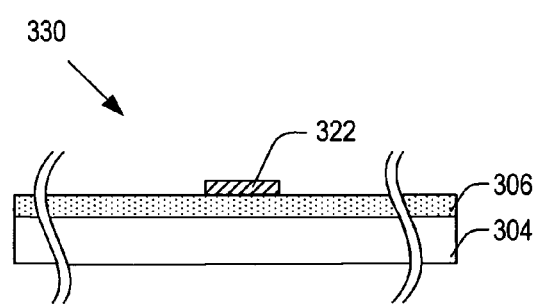
Figure 3E:
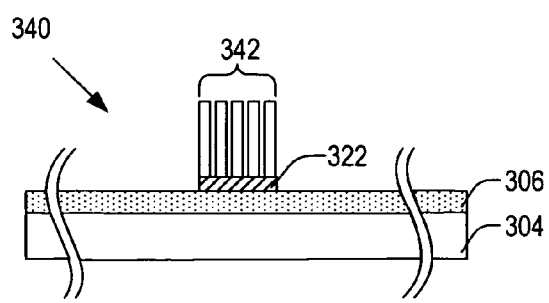
Figure 3F:
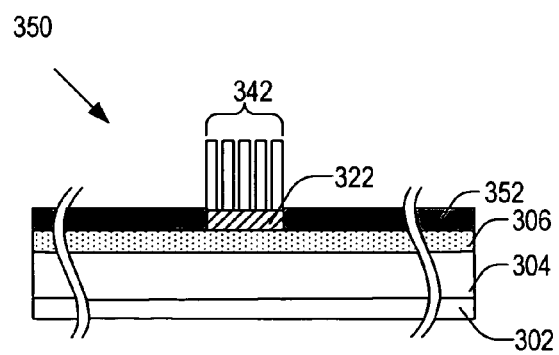

Subsequently, as depicted in FIG. 3B, the PR coating 308 may be etched to form a pattern 312 for CNT pillar forming areas. Then, a metal seed layer (CNT catalyst) 322 may be formed on the entire glass substrate, as illustrated in FIG. 3C. Next, the remaining PR coating 308 and a portion of metal seed layer (CNT catalyst) 322 formed over the PR coating may be lifted off generating a patterned metal seed layer 322 (FIG. 3D) and, subsequently, CNT pillars 342 may be grown on the metal seed layer 322 (CNT catalyst) (FIG. 3E). A conventional technique, such as chemical vapor deposition (CVD) technique, may be used to grow the CNT pillars 342 on the metal seed layer 322 (CNT catalyst). Then, an inorganic alignment layer 352 may be formed on the ITO layer 306, as illustrated in FIG. 3F. As a final step, an anti-reflection layer 302 may be formed on the other side of the glass 304.

Figure 4A:
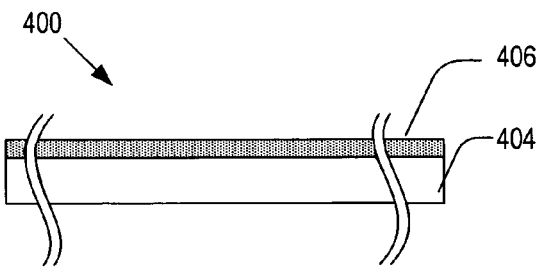
FIGS. 4A-4G illustrate steps of forming the glass portion of the nano-LOCS chip in FIG. 2A in accordance with an alternative embodiment of the present invention.
Figure 4B:
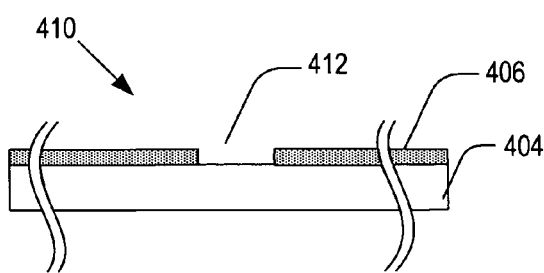
Figure 4C:
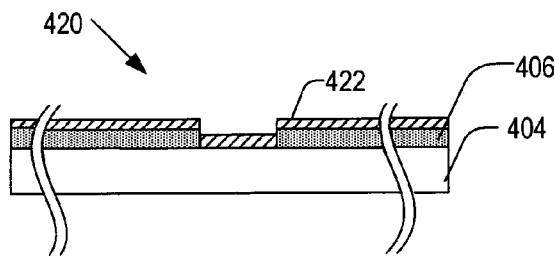
Figure 4D:
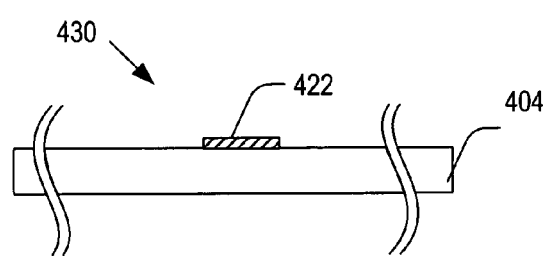
Figure 4E:
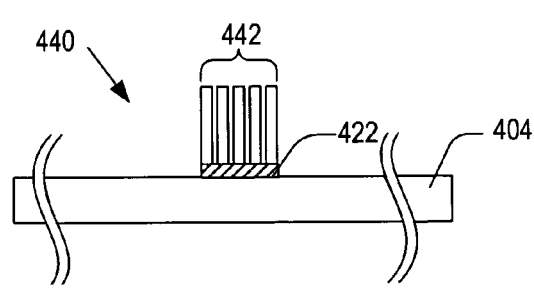
Figure 4F:
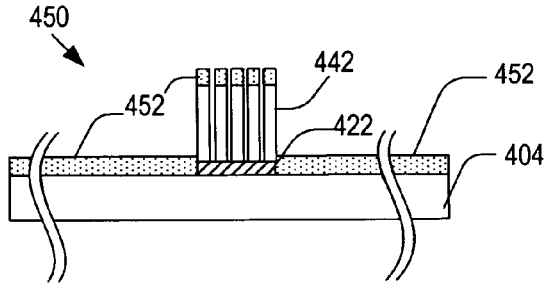
Figure 4G:
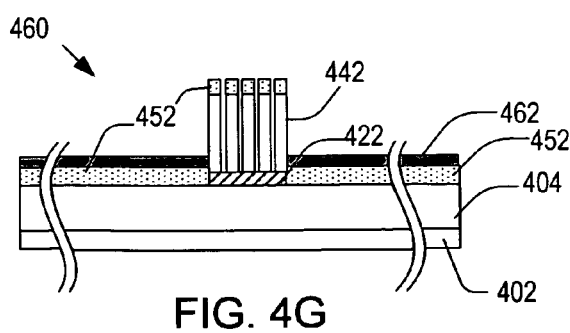
Figure 5A:
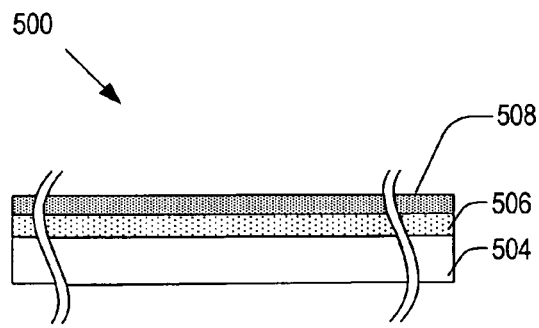
FIGS. 5A-5F illustrate steps of forming the glass portion of the nano-LOCS chip in FIG. 2A in accordance with another alternative embodiment of the present invention.
Figure 5B:
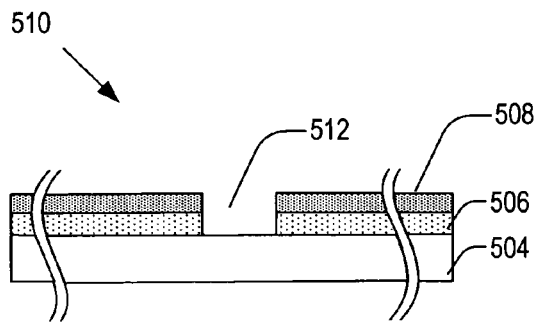
Figure 5C:
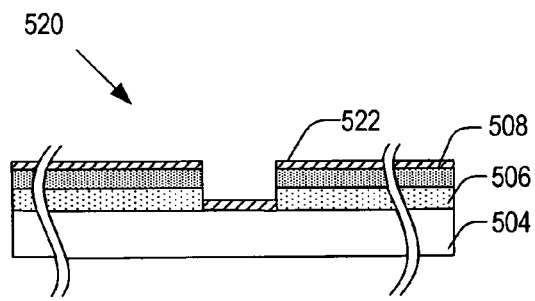
Figure 5D:
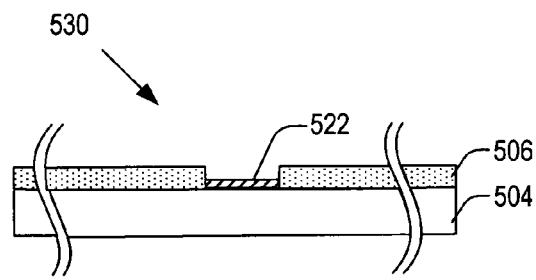
Figure 5E:
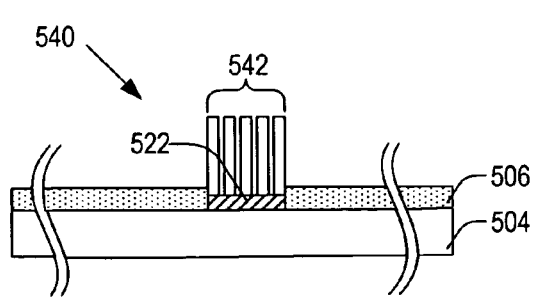
Figure 5F:
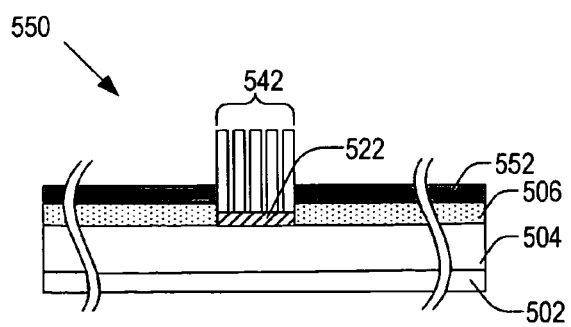

FIGS. 4A-4G are cross sectional diagrams of a glass portion at various steps of growing layers on a glass, taken along the direction B-B, in accordance with an alternative embodiment of the present invention. As depicted in FIG. 4A, a glass portion shown at 400 may include a glass 404 having a PR coating 406. Then, the PR coating 406 may be etched to form a pattern 412 for CNT pillar forming areas. Subsequently, a metal seed layer (CNT catalyst) 422 may be formed on the pattern 412 (FIG. 4C) and the remaining PR coating 406 may be lifted off of the glass portion 404 (FIG. 4D). Next, as illustrated in FIG. 4E, CNT pillars 442 may be grown on the metal seed layer (CNT catalyst) 422. Then, an ITO layer 452 may be formed over the entire region of the glass 404, as depicted in FIG. 5F. Next, an inorganic alignment layer 462 may be formed on the ITO layer 452 except the regions over CNT pillars 442, as illustrated in FIG. 4G. As a final step, an anti-reflection layer 402 may be formed on the other side of the glass 404.

FIGS. 5A-5F are cross sectional diagrams of a glass portion at various steps of growing layers on a glass, taken along the direction B-B, in accordance with another alternative embodiment of the present invention. The structure of layers depicted in FIG. 5F is quite similar to that in FIG. 3F, with the difference that an ITO layer 506 and a PR coating 508 may be etched such that the metal seed layer (CNT catalyst) 522 is formed on the glass 504 directly.

Figure 5G:
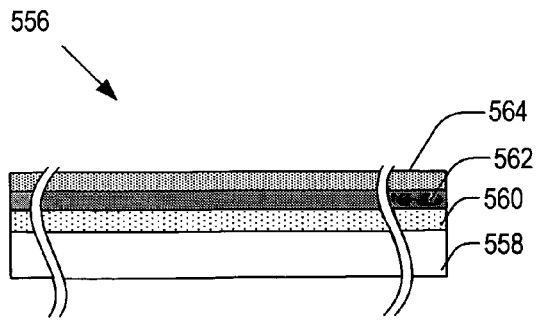
FIGS. 5G-5L illustrate steps of forming the glass portion of the nano-LOCS chip in FIG. 2A in accordance with still another alternative embodiment of the present invention.

FIGS. 5G-5L are cross sectional diagrams of a glass portion at various steps of growing the layers on the glass, taken along the direction B-B, in accordance with still another alternative embodiment of the present invention. As depicted in FIG. 5G, an ITO layer 560 and an inorganic alignment layer 562 may be formed on one side of a glass 558. The glass 558 may be made of a material that has a high melting point since CNT pillars are required to grow thereon. The ITO layer 560 may be formed on the glass 558 by a conventional sputtering technique. Then, the inorganic alignment layer 562 may be formed on the ITO layer by the same technique. Next, a photo-resist (PR) layer or coating 564 may be coated on the ITO layer 560 to form a glass portion shown at 556.

Figure 5H:
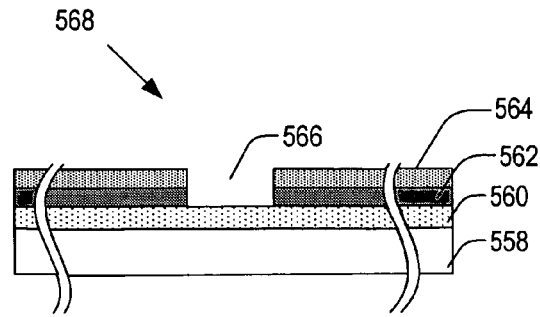
Figure 5I:
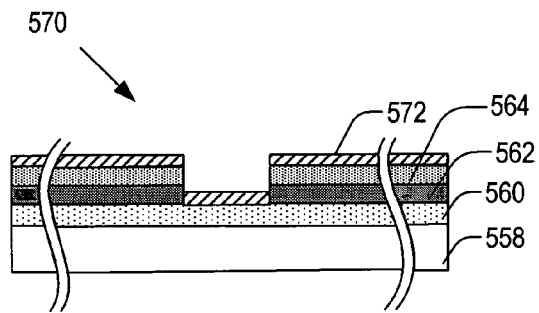
Figure 5J:
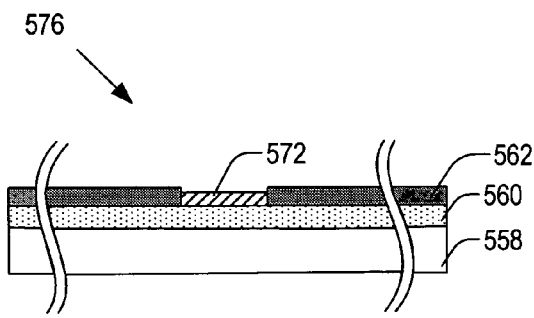
Figure 5K:
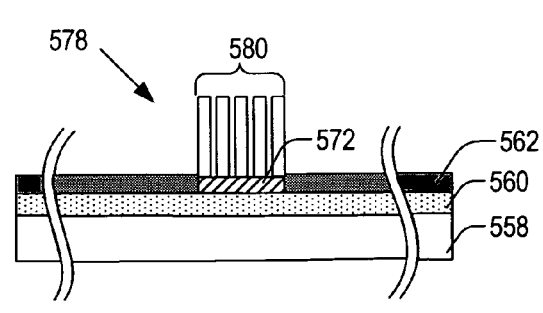
Figure 5L:
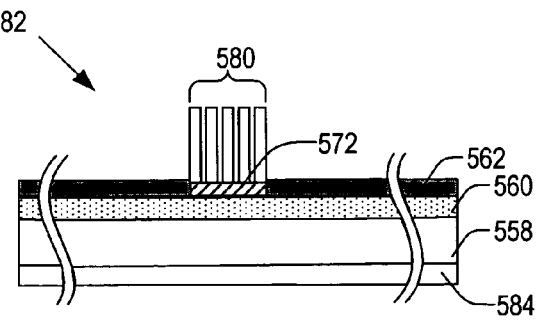

Subsequently, as depicted in FIG. 5H, the PR coating 564 and the inorganic alignment layer 562 may be etched to form a pattern 566 for CNT pillar forming areas. Then, a metal seed layer (CNT catalyst) 572 may be formed on the entire glass substrate, as illustrated in FIG. 5I. Next, the remaining PR coating 564 and a portion of metal seed layer (CNT catalyst) 572 formed over the PR coating may be lifted off generating a patterned metal seed layer 572 (FIG. 5J) and, subsequently, CNT pillars 580 may be grown on the metal seed layer 572 (CNT catalyst) (FIG. 5K). A conventional technique, such as chemical vapor deposition (CVD) technique, may be used to grow the CNT pillars 580 on the metal seed layer 572 (CNT catalyst). As a final step, an anti-reflection layer 584 may be formed on the other side of the glass 558 (FIG. 5L).

It should be apparent to those of the ordinary skill that the processes illustrated in FIGS. 3A-5L may be modified in a variety of ways without departing from the spirit and scope of the present invention. For example, the metal seed layer (CNT catalyst) 322 (FIG. 3D) may be generated by a conventional sputtering technique with a patterned shadow mask placed over the ITO layer 306, which may be used in place of the steps illustrated in FIGS. 3A-3C. In another example, the inorganic alignment layer 352 (FIG. 3F) may be formed over the entire surface of the glass 304, which may simplify the step of forming the inorganic alignment layer 352. In still another example, the ITO layer may be replaced by a thin transparent carbon nanotube layer.

Figure 6:
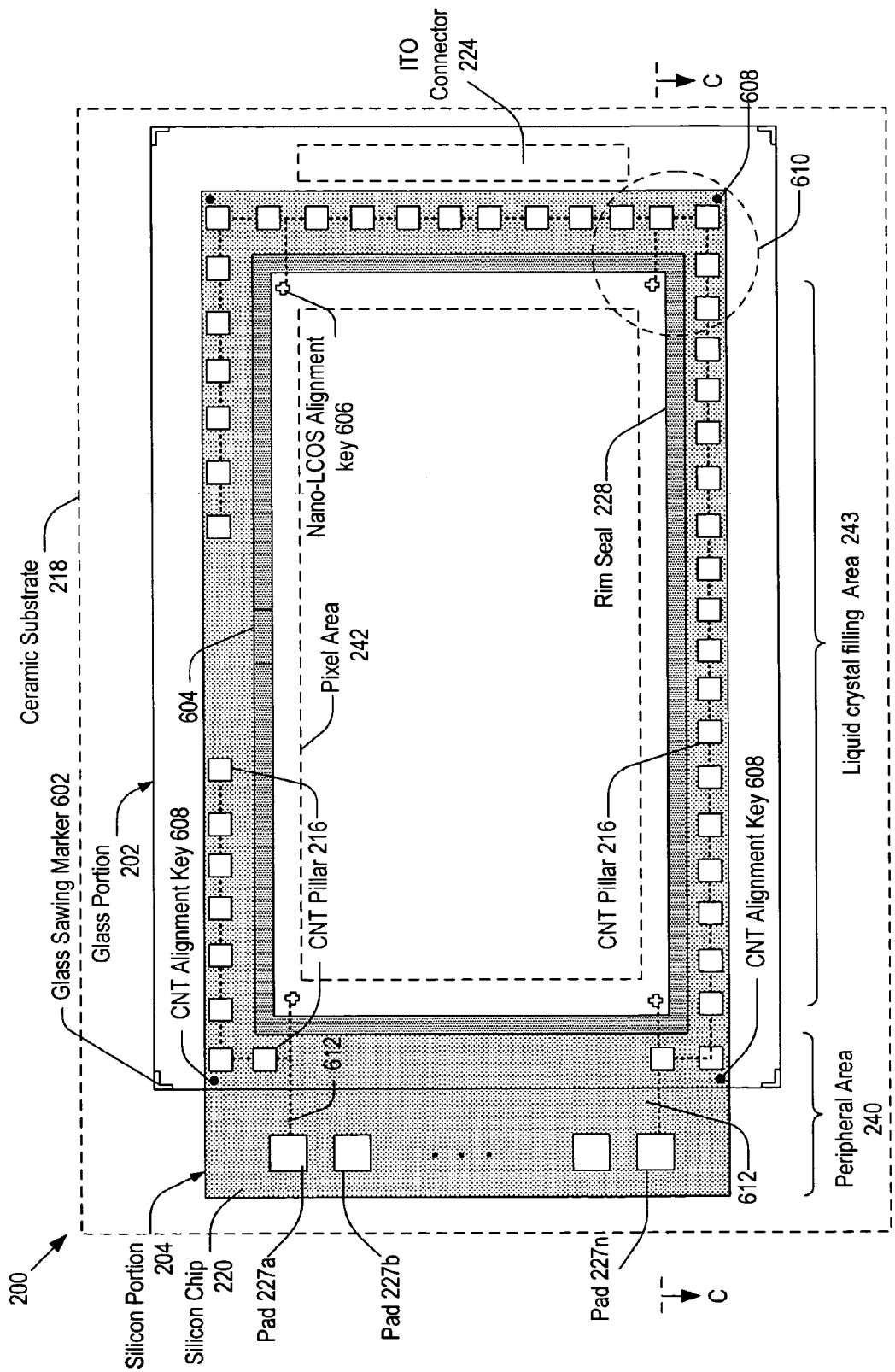
FIG. 6 is a top view of the nano-LCoS chip depicted in FIG. 2A.

FIG. 6 is a top view of the nano-LCoS chip depicted in FIG. 2A, where the like numerals refer to the same item. As mentioned above, the nano-LCoS chip shown at 200 may be formed by mating the glass portion 202 with the silicon portion 204. Prior to mating the two portions, the rim seal 228 devoid of the gate portion 604 may be formed on the silicon chip 220. Then, the liquid crystal may fill the liquid crystal filling area 243 through the gate portion 604. Subsequently, the gate portion 604 may be added to the silicon chip 220 forming a seal around the liquid crystal. The four CNT alignment keys 608, where each key has a pair of marks on both the glass portion 202 and the silicon chip 220, may be used to align the glass portion 202 with respect to the silicon chip 220 during the mating process.

The nano-LCoS chip may operate to form an image in one color. Typically, three of the nano-LCoS chips may be needed to visualize the image in full color for human eyes. To align the three nano-LCoS chips with respect to each other, nano-LCoS alignment keys 606 may be used, where the keys 606 are electrically connected to V$_{ITO}$ pads, say 227a and 227n, and CNT pillars 216 via the connection lines 612. (Hereinafter, the term V$_{ITO}$ refers to the voltage applied to the ITO layer 210 during operation.) The nano-LCoS alignment keys 606, formed in the silicon chip 220 (FIG. 7), may be located near the pixel area 242. By applying V$_{ITO}$ to both the nano-LCoS alignment keys 606 and ITO layer 210, a portion of the liquid crystal corresponding to the alignment keys 606 become transparent fiduciary marks for the alignment of the nano-LCoS chips. More detailed description of the nano-LCoS alignment keys can be found the previously referenced U.S. Provisional Applications No. 60/615,921, entitled "Carbon nanotube technology in liquid crystal on silicon micro-display," filed on Oct. 05, 2004, and No. 60/635,541, entitled "Carbon nanotube technology in liquid crystal on silicon micro-display with enhanced scalability and alignment," filed on Dec. 13, 2004, which are incorporated herein by their entirety. The silicon chip 220 may be fabricated to include the connection lines 612, where the connection lines 612 may connect the V$_{ITO}$ pads 227a and 227n to the nano-LCoS alignment keys 606.

Figure 7:
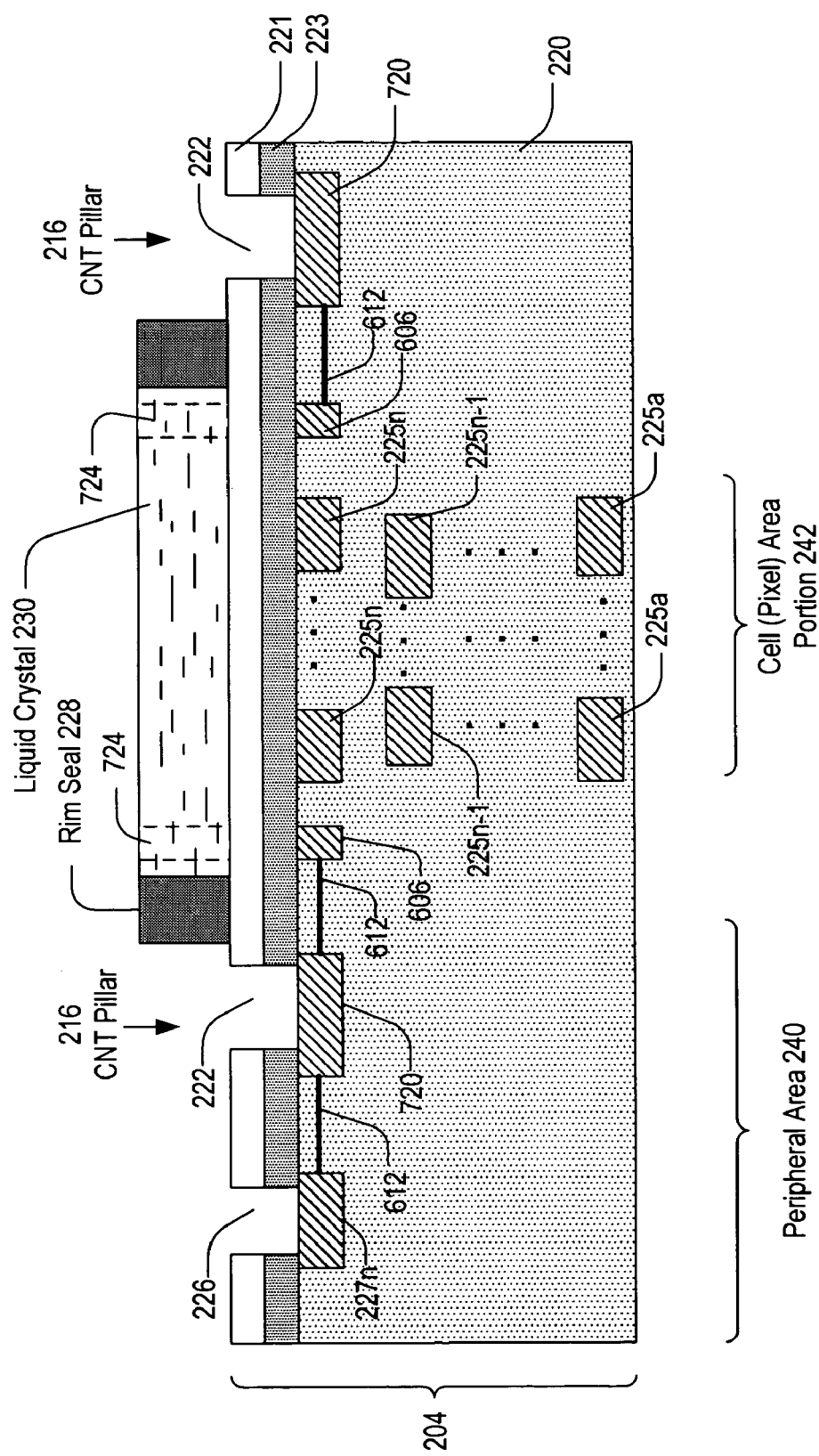
FIG. 7 is a cross sectional view of the silicon portion of the nano-LCoS chip depicted in FIG. 6, taken along the direction C-C.

FIG. 7 is a cross sectional view of the silicon portion and liquid crystal depicted in FIG. 6, taken along the direction C-C. As illustrated, the silicon chip 220 may include circuit elements, such as a plurality of layers 225a-225n, wherein the top layer 225n may be made of metal and reflect the incoming light 232a (FIG. 2A). More detailed description of the layers and other circuit elements in the silicon chip 220 may be found in the previously referred U.S. provisional application, entitled "Nano-liquid crystal on silicon chip having reduced noise," filed on Aug. 23, 2005, which is incorporated herein by reference. Located at the bottom of the pad holes 226a-n and CNT receptor holes 222 are pads 227a-n and metal elements 720, respectively. The pads 227a-n may connect the circuit elements of the silicon chip 220 to outer circuit elements. One or more of the pads 227, say 227a and 227n, may be used to provide a voltage of V$_{ITO}$ for the ITO layer 210 (FIG. 2A) via the electrical connection comprising the V$_{ITO}$ pads 227a, 227n, connection lines 612, metal elements 720 and CNT pillars 216.

It is noted that the nano-LCoS alignment keys 606 may be connected to the V$_{ITO}$ pads 227a and 227n via the connection lines 612 and the metal elements 720, where the metal elements 720 are connected to the CNT pillars 216 and, in turn, to the ITO layer 210. By applying the same voltage to both the keys 606 and ITO layer 210, portions 724 of the liquid crystal 230 may become transparent fiduciary marks for alignment of nano-LCoS chips with respect to each other. The nano-LCoS alignment keys 606 may be made of a conducting material, such as metal.

Figure 8A:
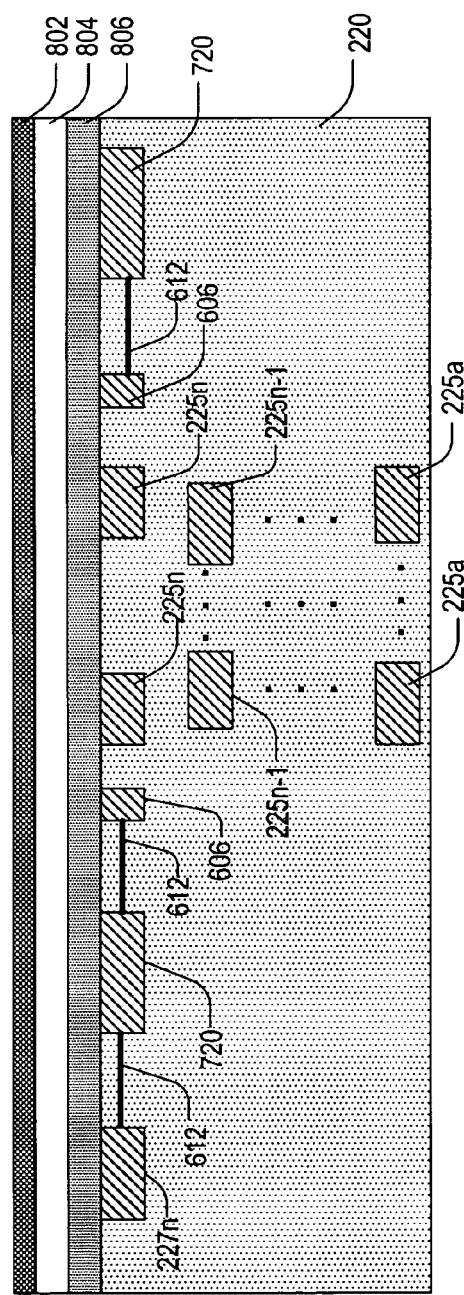
FIGS. 8A-8B illustrate steps of forming the passivation and inorganic alignment layers of the nano-LCoS chip in FIG. 2A in accordance with the preferred embodiment of the present invention.
Figure 8B:
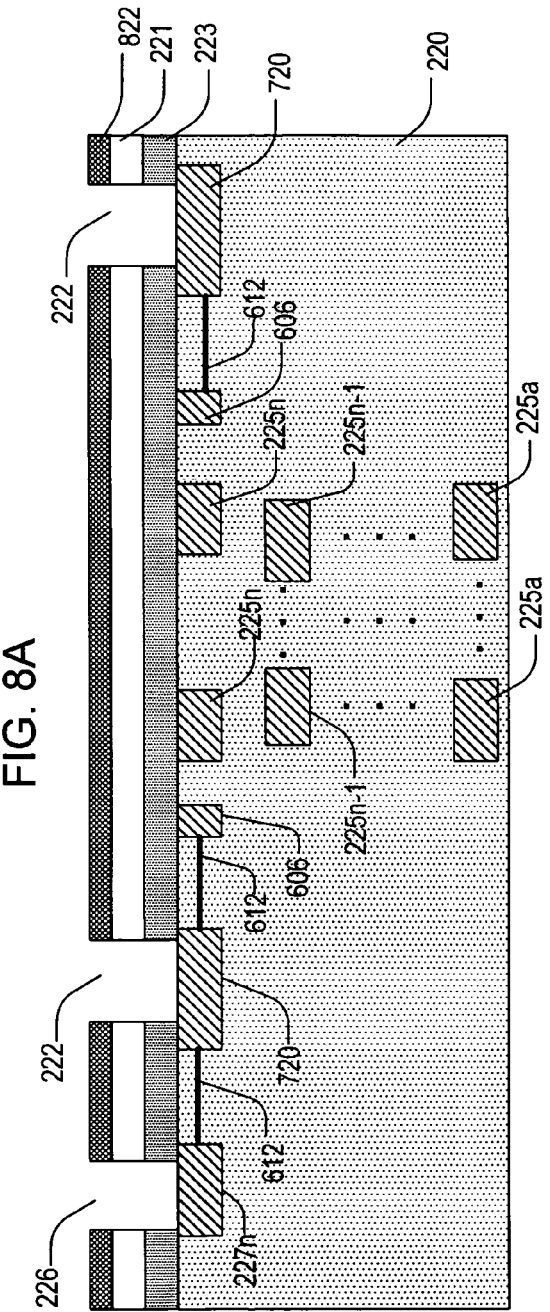

FIG. 8A-8B are cross sectional diagrams of a silicon portion at various steps of forming passivation and inorganic alignment layers on a silicon chip, taken along the direction C-C, in accordance with the preferred embodiment of the present invention. As illustrated in FIG. 8A, a passivation layer 806, an inorganic alignment layer 804, and a photoresist (PR) coating 802 may be formed on a silicon chip 220. Then, the PR coating 802 may be etched first to form a pattern of the pad holes 226 and CNT receptor holes 222. Subsequently, as depicted in FIG. 8B, the passivation layer 806 and the inorganic alignment layer 804 may be etched following the pattern to form the pad holes 226 and CNT receptor holes 222. Next, the remaining PR coating 822 may be stripped off.

FIGS. 9A-9B are top views of alternative embodiments of the nano-LCoS chip depicted in FIG. 2A and including CNT pillars that have various geometrical shapes and arrangements. Each of FIGS. 9A-9B is an enlarged schematic diagram of a portion corresponding to the circled area 610 in FIG. 6. As illustrated in FIG. 9A, the CNT pillars 908 may be arranged in two rows, and electrically connected to each other and to nano-LCoS alignment key 910 via connection lines 911 that may carry a voltage of V$_{ITO}$. As in the case of FIG. 6, the nano-LCoS alignment keys 910 and 930 may be located outside of the pixel area 906 and 926, respectively. Also, the keys are electrically connected to the CNT pillars 908 and 928 by the connection lines 911 and 923, respectively.

As illustrated in FIG. 9B, the CNT pillar 928 may have a polygonal cross sectional shape. It should be apparent to those of ordinary skill in the art that the present invention may be practiced with CNT pillars that have other suitable shapes and arrangements. Likewise, the CNT alignment keys 909 and 929 may have other suitable geometrical shapes.

It should be understood, of course, that the foregoing relates to exemplary embodiments of the invention and that modifications may be made without departing from the spirit and scope of the invention as set forth in the following claims.

What is claimed is:

1. A nano-liquid crystal on silicon (LCoS) chip, comprising:
   a first substrate portion;
   a rim seal having a generally closed loop shape and laid on said first substrate portion to form a space surrounded by said rim seal and said first substrate portion;
   a second substrate portion aligned substantially in parallel to said first substrate portion and positioned over said rim seal to enclose said space; and
   a plurality of carbon-nanotube (CNT) pillars having a predetermined height and grown on said second substrate portion and positioned between said first and second substrate portions to provide a uniform spacing therebetween,
   wherein a liquid crystal is filled in said space.

2. A nano-LCoS chip as recited in claim 1, wherein said second substrate portion includes a glass substrate that is made of one material selected from the group consisting of quartz, fused silica, high temperature glass, and corning glass.

3. A nano-LCoS chip as recited in claim 2, wherein said second substrate portion further includes a metal seed layer formed on the bottom surface of said glass substrate and said CNT pillars are grown on said metal seed layer.

4. A nano-LCoS chip as recited in claim 2, wherein said second substrate portion further includes an anti-reflection layer formed on the top surface of said glass substrate.

5. A nano-LCoS chip as recited in claim 2, wherein said second substrate portion further includes a conducting layer that is electrically connected to said CNT pillars and formed on the bottom surface of said glass substrate.

6. A nano-LCoS chip as recited in claim 5, wherein said second substrate portion further includes a first inorganic alignment layer that is formed on said conducting layer and prevents chemical reactions between said conducting layer and said liquid crystal.

7. A nano-LCoS chip as recited in claim 5, wherein said second substrate portion further includes a metal seed layer formed on said conducting layer and said CNT pillars are grown on said metal seed layer.

8. A nano-LCoS chip as recited in claim 5, wherein said conducting layer is made of a material selected from the group consisting of indium tin oxide and carbon nanotube.

9. A nano-LCoS chip as recited in claim 1, wherein said second substrate portion includes at least one glass sawing marker.

10. A nano-LCoS chip as recited in claim 1, wherein said CNT pillars are positioned along the perimeter of said second substrate portion.

11. A nano-LCoS chip as recited in claim 1, wherein said first substrate portion includes a silicon chip.

12. A nano-LCoS chip as recited in claim 11, wherein said first substrate portion further includes:
a passivation layer formed on said silicon chip; and
a second inorganic alignment layer for preventing chemical reactions between said passivation layer and said liquid crystal, said second inorganic alignment layer formed on said passivation layer,
wherein said passivation and second inorganic alignment layers include a plurality of CNT receptor holes for engaging said CNT pillars.

13. A nano-LCoS chip as recited in claim 11, wherein said silicon chip includes a plurality of metal elements that are electrically connected to each other via connection lines, each said metal element being in contact with a corresponding one of said CNT pillars.

14. A nano-LCoS chip as recited in claim 11, wherein said second substrate portion includes a glass substrate and a conducting layer that is electrically connected to said CNT pillars and that is formed on the bottom surface of said glass substrate.

15. A nano-LCoS chip as recited in claim 14, wherein said silicon chip includes at least one nano-LCoS alignment key that is electrically connected to said CNT pillars and wherein said nano-LCoS alignment key makes a portion of said liquid crystal transparent when a predetermined voltage is applied to said conducting layer and said nano-LCoS alignment key.

16. A nano-LCoS chip as recited in claim 1, further comprising:
at least one pair of CNT alignment keys that are formed on said first and second substrate portions, respectively, said pair of CNT alignment keys used to align said first substrate portion with said second substrate portion during mating said first substrate portion with said second substrate portion.

17. A nano-LCoS chip as recited in claim 1, wherein said rim seal is made of an ultra-violet (UV) glue.

18. A nano-liquid crystal on silicon (LCoS) chip, comprising:
a silicon substrate portion including:
a silicon chip;
a passivation layer formed on said silicon chip; and
a first inorganic alignment layer formed on said passivation layer;
a rim seal having a generally closed loop shape and laid on said first inorganic alignment layer to form a space surrounded by said rim seal and said first inorganic alignment layer;
a glass substrate portion aligned substantially in parallel to said silicon substrate portion and located over said rim seal and including:
a glass substrate;
an anti-reflection layer formed on the top surface of said glass substrate;
an indium tin oxide (ITO) layer formed on the bottom surface of said glass substrate; and
a second inorganic alignment layer formed on the bottom surface of said ITO layer and contacting said rim seal to enclose said space; and
a plurality of carbon-nanotube (CNT) pillars having a predetermined height and grown on said glass substrate portion and positioned between said glass and silicon substrate portions to provide a uniform spacing therebetween, said passivation and first inorganic alignment layers including a plurality of CNT receptor holes for engaging said CNT pillars,
wherein a liquid crystal is filled in said space.

19. A nano-LCoS chip as recited in claim 18, wherein said glass substrate portion further includes a metal seed layer formed on said ITO layer and wherein said CNT pillars are grown on said metal seed layer.

20. A nano-LCoS chip as recited in claim 19, wherein said glass substrate portion further includes a metal seed layer formed on the bottom surface of said glass substrate and wherein said CNT pillars are grown on said metal seed layer.

21. A nano-LCoS chip as recited in claim 18, wherein said silicon chip includes at least one nano-LCoS alignment key that is electrically connected to said CNT pillars and wherein said nano-LCoS alignment key makes a portion of said liquid crystal transparent when a predetermined voltage is applied to said ITO layer and said nano-LCoS alignment key.

* * * * *